Patented May 16, 1950

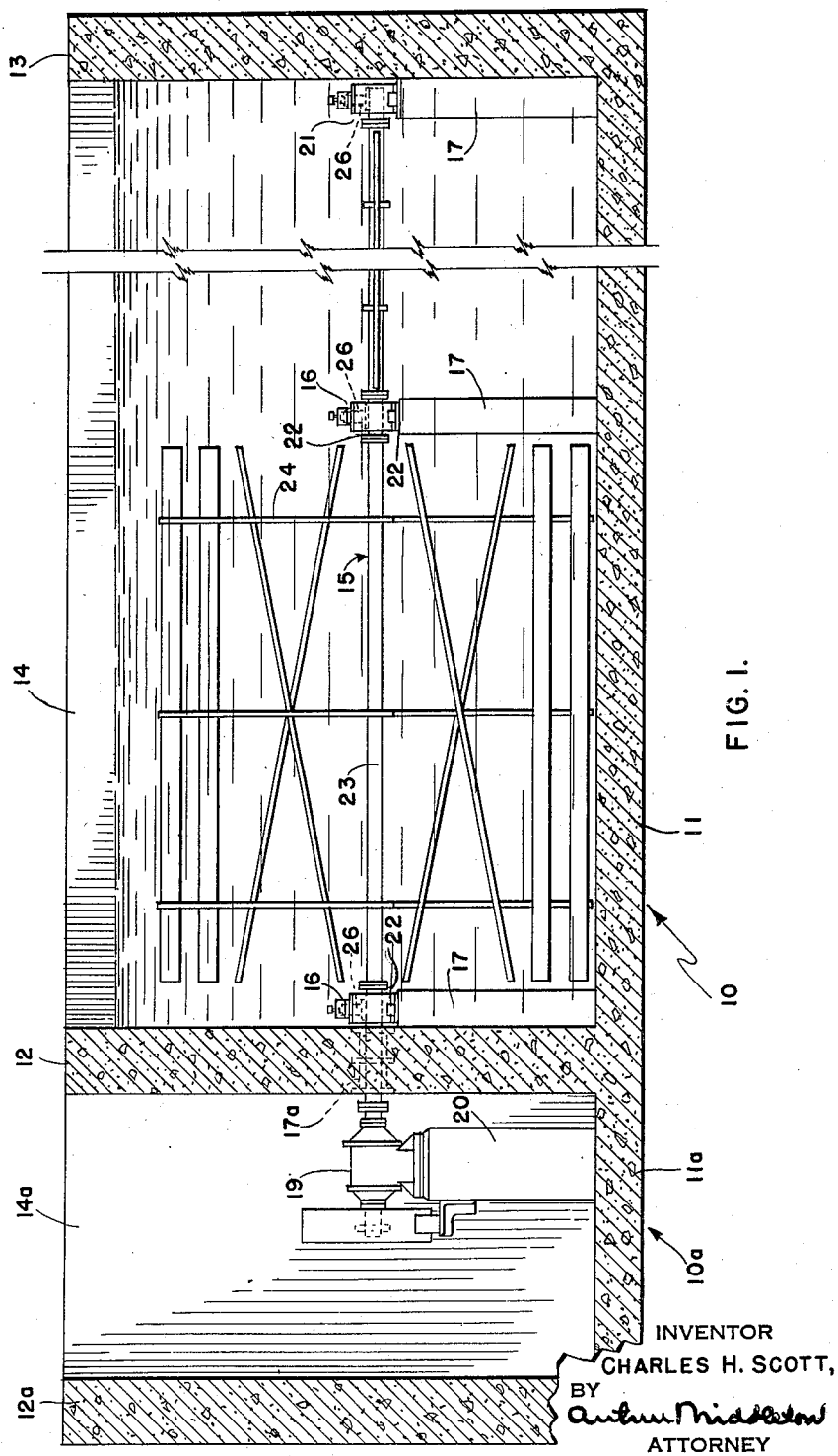

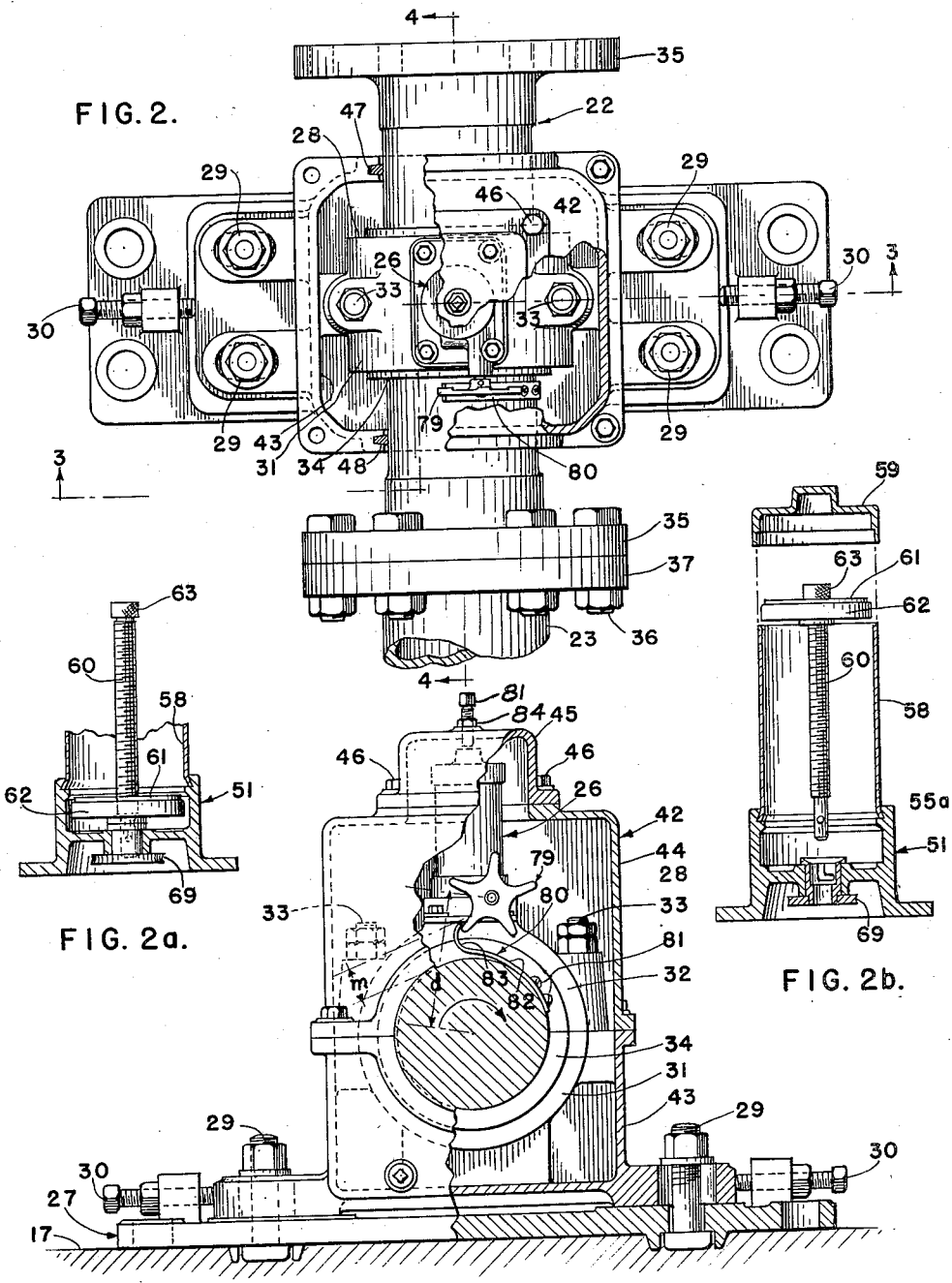

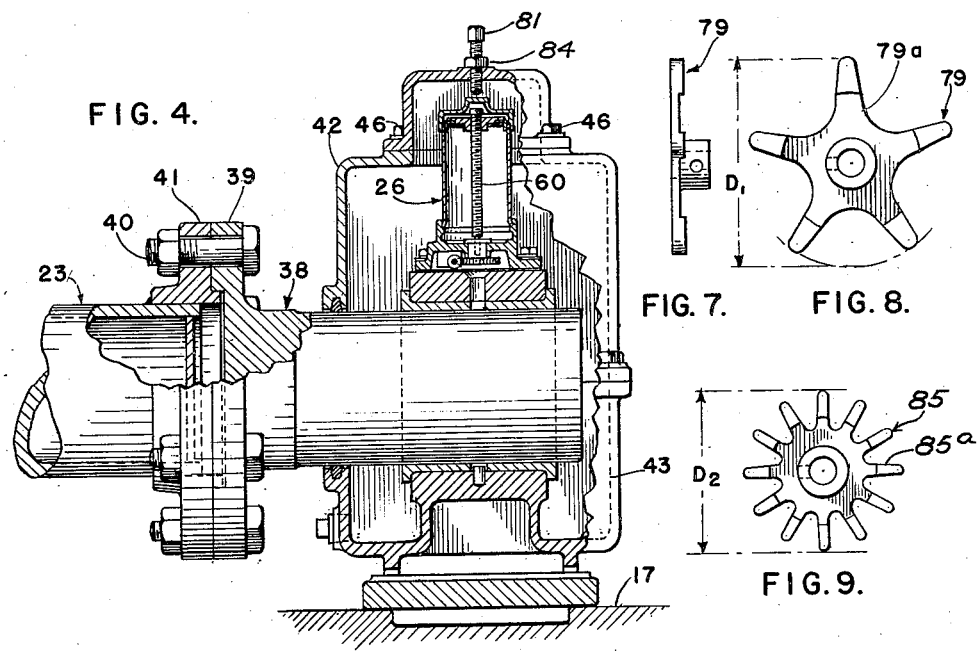
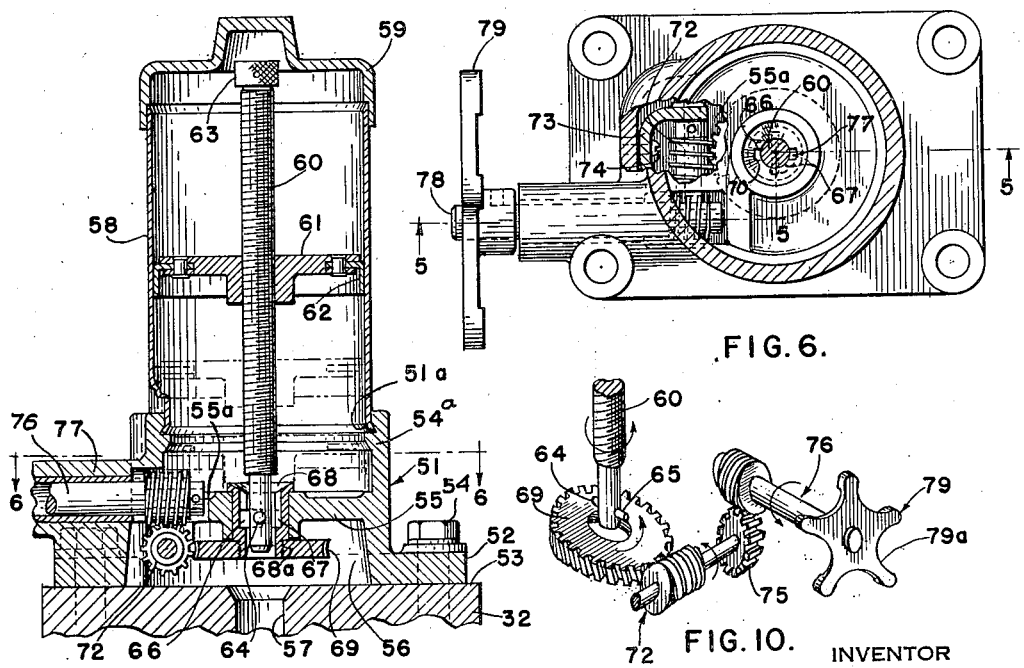

2,507,579

UNITED STATES PATENT OFFICE 2,507,579

BEARING WITH AUTOMATIC LUBRICATOR

Charles H. Scott, Westport, Conn., assignor to The Dorr Company, Stamford, Conn., a corporation of Delaware Application November 9, 1946, Serial No. 708,871

4 Claims. (Cl. 184—37)

This invention relates to automatically controlled forced-feed lubricators for the bearings of rotary shafts, in which the lubricant or grease is extruded from a grease container automatically at a slow rate controlled by mechanism driven by the rotation of the shaft itself. The grease is forcibly fed in desirable minute stepwise quantities through speed-reducing mechanism or gearing actuated by the rotation of the shaft which rotation is translated into slow motion of a grease displacing or extruding member operating in the grease container.

In the kind of lubricator herein contemplated a screw controlled grease-displacing piston must be re-set when it has reached the end of its travel in order that the grease container may be refilled. Such re-setting and refilling usually involves disturbance of speed-reducing mechanism or gearing disposed externally of the grease container, which speed-reducing mechanism engages the screw or spindle which controls the movement of the piston.

It is one of the objects to provide an automatic lubricator especially suited for underwater operation to serve the bearings of submerged shafts.

Another object is to provide an automatic lubricator which in turn has self-lubricating speed-reducing mechanism.

Another object is to provide an automatic bearing lubricator with screw actuated grease displacing piston in which the piston is easily accessible as well as resettable for refilling of the grease container without necessitating the disturbance or dismounting of the speed-reducing mechanism or gearing.

These objects are attained by disposing the speed-reducing mechanism internally of the grease container; by providing easily detachable coupling means between a piston-actuating screw member and the speed-reducing mechanism; and also by encasing and sealing-off the bearing unitary with the lubricator in such a manner as to confine within the encasing structure any bearing grease escaping from the bearing surface.

According to one feature the speed-reducing mechanism is disposed internally at the foot end or discharge end of a cylindrical grease container with provisions for allowing the screw member to be readily uncoupled from the mechanism and to be withdrawn from the grease container along with the piston and along with a removable top portion of the grease container.

According to another feature a split casing or sealing jacket that surrounds the bearing as well as the lubricator has threaded into it an adjustable jack screw co-axial with the cylindrical grease container for holding the removable top portion of the grease container in place within the casing.

Still other features lie in the provision of automatic safety means for interrupting the driving connection between the shaft and the screw-controlled grease displacing piston.

According to a more specific feature a resiliently yieldable actuating element or finger rotates unitary with the shaft and imparts the stepwise movement to the mechanism in accordance with the revolutions of the shaft except when an obstruction will cause it to slip past effectively.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a longitudinal somewhat diagrammatic section through a water-treatment tank equipped with submerged agitating mechanism showing environmentally the use of submerged lubricator-equipped bearings;

Fig. 2 is a part-sectional plan view of a lubricator-equipped bearing with through-going shaft;

Fig. 2ª is a detail sectional view partially broken off of the lubricator, indicating the final end position of the grease-displacing piston;

Fig. 2ᵇ is a detail view partially broken off of the lubricator, with parts drawn apart and the grease-displacing piston re-set to initial position;

Fig. 3 is a part-sectional end view of the bearing with lubricator taken on the line 3—3 of Fig. 2;

Fig. 4 is a part-sectional side view of a bearing with lubricator similar to that shown in Figs. 2 and 3 taken on line 4—4 of Fig. 3 although with non-throughgoing shaft;

Fig. 5 is an enlarged sectional detail view of the lubricator shown in Fig. 4;

Fig. 6 is a cross-section through the lubricator taken on the line 6—6 in Fig. 5;

Figs. 7 and 8 are views of a star-wheel for stepwise actuation of the speed-reducing mechanism;

Fig. 9 shows a substituting star-wheel of smaller tooth pitch;

Fig. 10 is a perspective detail view of a relative disposition of the gear elements of the speed-reducing mechanism.

As an example of environment or technical application of an automatic force-lubricated grease-fed bearing or journal according to this invention there is shown in Fig. 1 the semi-diagrammatic longitudinal sectional view of a water-treatment tank equipped with submerged agitating mechanism for the flocculation treatment of the water. A concrete tank structure comprises a tank 10 proper and at one end thereof a pit 10a. The tank has a bottom 11, end walls 12 and 13 and side walls 14. The pit 10a is defined by the tank end wall 12, by an outer end wall 12a by side walls 14a, and by a bottom portion 11a. A horizontal rotary shaft 15 extends from end to end of the tank 10 and is rotatable in journal bearings, herein briefly termed journals 16, mounted on pedestals 17. The shaft 15 extends through the end wall 12 by way of sealing glands or other suitable sealing means indicated at 17a. The shaft thus protrudes outwardly from end wall 12 and is driven as through a reduction gear unit 19 mounted on pedestal 20 and driven by a motor (not shown). The extreme free end of the shaft has a journal 21 supporting the non-through-going terminal portion of the shaft, while the other journals 16 carry through-going portions of the shaft. The shaft 15 is shown to be sectionalized comprising short sections 22 carried by the journals and alternating with long sections 23 each carrying an agitating or paddle structure 24. The sections are connected with one another by flanges centered with respect to each other and bolted together as will be seen in detail further below. Each journal is provided and unitary with an encased lubricator 26 for automatic forced-feeding of grease to the rotary bearing surfaces of the shaft.

Referring to Figs. 2, 3 and 4, the lubricator 26 is mounted upon the bearing-block proper and embodied in a journal such as indicated at 16 (in Fig. 1) with through-going shaft or in a journal such as indicated at 21 (in Fig. 1) with non-through-going shaft.

A journal 16 is mounted upon a base plate 27 anchored upon a pedestal 17 (anchoring screws not being shown). The journal comprises a bearing-block proper 28 within the casing and adjustably fastened upon the base plate 27 as by anchoring bolts 29 and horizontally adjustable upon the base plate and transversely of the axis of the shaft 15 by means of a pair of adjustment or alignment screws 30. The bearing block 28 is split into a lower half or base portion 31 and an upper half 32, both halves being held together as by bolts 33. A split bushing for the shaft is shown at 34.

The journal 16 shown in Fig. 2 is shown to carry a through-going short section 22 of the shaft 15 provided at each end with a flange 35 bolted as at 36 to a companion flange 37 constituting the end of an adjoining long section 23 of the shaft.

The journal shown in Fig. 4 differs structurally from that in Fig. 2 only because of the fact that it is arranged to carry a short non-through-going section or terminal end portion 38 of the shaft 15, the end portion 38 having a flange 39 by which it is bolted at 40 to a companion flange 41 constituting the end of an adjoining long section 23 of the shaft.

The journal 16 is unitary with a jacket 42 surrounding the lubricating bearing surfaces of the shaft as well as the lubricator 26 associated therewith. The jacket comprises a lower half 43 integral with the base portion or lower half 31 of bearing-block 28 and an upper removable half or shell 44. The upper half or shell 44 of the jacket has a removable dome portion or cap 45 into which extends the upper or free end portion of the lubricator 26, the dome portion being held in place by screw bolts 46. In order to actuate the through-going section of the shaft 15, the jacket 42 is provided with a pair of corresponding openings provided with annular seals 47 and 48 surrounding the shaft, while a split jacket 49 in Fig. 4 accommodates a non-through-going section of the shaft and is therefore provided with only one opening and one seal therefor surrounding the shaft, the opposite side of the jacket being closed, the jacket 49 otherwise being similar in construction and function to jacket 42 of the Fig. 2 embodiment.

*Description of the lubricator*

The lubricator 26 proper comprises a hollow base or casting 51 having a bottom flange 52 by which it is fastened upon the horizontal top face 53 of the upper half 32 of bearing block 28 by means of screw bolts 54; and a substantially cylindrical hollow portion 54a rising from the flange 52 and horizontally divided by a partial partition 55 providing for a chamber 56 underneath the partition which chamber communicates with the rotary bearing surfaces of the shaft through a vertical bore 57 provided in the upper half 32 of the bearing-block. The partition 55 has a passage opening 55a (see Figs. 5 and 6). Internally upon the upper edge portion of the base 51 there is provided a circular undercut or groove into which is swaged or expanded the bottom edge portion 51a of a substantially cylindrical grease container portion 58 over the open top end of which fits a removable cover 59.

A screw member 60 extends longitudinally within and substantially co-axial with the container portion 58, upon which screw member engages a nut which is in the form of a piston member 61 having peripherally fastened thereto a sealing cuff 62 whereby the piston member has more or less tight frictional contact with the inner cylindrical face of the container portion 58.

The upper knurled end portion 63 of the screw member is entirely free and unencumbered and is freely accessible when the cover 59 is removed. The screw member has a reduced unthreaded cylindrical lower end portion having a pair of laterally extending symmetrical lugs 64 and 65 adapted to lodge in a corresponding pair of bayonet undercuts 66 and 67 provided internally of a socket 68 which is rotatable with the screw member 60 since it is mounted for rotation in the partial partition 55 although confined against axial movement. The socket 68 constitutes the upwardly extending hub portion of a worm gear 69 fastened to the socket 68 by means of the threaded connection 68a. The socket 68 furthermore has a pair of internal vertical symmetrical grooves or recesses 70 and 71 through which the corresponding lugs 64 and 65 respectively can be vertically inserted or removed when establishing or disrupting the bayonet connection of the coupling between the socket 68 and the screw member 60. This bayonet connection or coupling has sufficient play to allow for a degree of universal joint motion as between the screw member 60 and the worm gear 69.

The worm gear 69 herein termed the secondary worm gear meshes with a worm of a worm shaft 72 herein termed the secondary worm shaft the ends of which are rotatably supported in a bracket 73 fastened to the base or casting 51 as indicated by screw 74. The secondary worm shaft 72 also carries fixed thereon a worm gear 75 herein termed the primary worm gear which in turn is engaged by the worm of a worm shaft 76 herein termed the primary worm shaft. The primary worm shaft rotates in a bearing portion 77 constituting part of the base 51 and extends at right angles to as well as above the secondary worm shaft 72 and has a free end portion 78 extending outwardly from the casing 51 and having fixed thereon a star-wheel 79. The primary shaft 76 extends parallel to the axis of the shaft 15 and is shown to be spaced therefrom (see Fig. 3) a distance "d." Upon the shaft 15 is fixed a finger 80 by means of screws 81. The finger 80 has a body portion 82 curved approximately to conform to the radius of the shaft section 22 and a terminal portion 83 which is curved oppositely thereto and extends into the reach of the prongs of the star-wheel 79. The finger 80 is of flat and resiliently yieldable material so that it may flex in case of excessive strain and slip past the star-wheel 79 ineffectively in case it should accidentally strike the tip of a prong such as 79a of the star-wheel 79.

The cover 59 of the container portion 58 is held in place by a vertical set screw 81 threaded into the top center of the dome portion 45 and secured by a lock-nut 84.

In Fig. 9 is shown an example of an alternate star-wheel 85 which may replace the star-wheel 79 when a slower stepwise advance of the feed is desired. The wheel 85 is shown to have twelve prongs 85a as compared with the five prongs 79a, and to be of a smaller diameter $D_2$ than the diameter $D_1$ of the star-wheel 79. When the smaller star-wheel 85 is used instead of the larger wheel 79, a correspondingly shaped actuating finger must also be used instead of the finger 80, it being important that the dimension "m" of the finger be properly established in each case.

Operation

Each revolution of the shaft 15 or of short sections 22 and 38 thereof will cause the finger 80 to engage another one of the five prongs 79a of star-wheel 79 and consequently turn the same through about one-fifth of one revolution of primary worm shaft 76. This one-fifth is reduced through the total ratio of the primary and the secondary worm drive and further through the ratio embodied in the screw member 60.

If the shaft 15 is assumed to be rotating at 2½ R. P. M., with five prongs or points on the star-wheel 79, and assuming that both worms are single thread and that one worm gear has forty teeth and the other one hundred eight teeth, then in one week the shaft 15 would make:

$$\frac{2.5 \times 60 \times 24 \times 7}{5 \times 40 \times 108} = 1.16 \text{ revolutions}$$

If, for simplicity, this were to be rounded to, say, one revolution per week, then the piston member 61 would advance by one thread of the screw member 60 per week. If the screw member has sixteen threads per inch of length, then the piston would advance 1/16" per week or in fifty-two weeks a little over 3".

If the container portion 58 is filled with grease once a year, it would lubrication continually between re-fills. By providing for a 4" piston travel one may allow for change of schedule or neglect.

The piston member 61 is normally kept from turning by the friction between the cuff 62 and the inner face of the container portion 58 and therefore will advance at the rate at which the screw member 60 is turning. However (see Fig. 2a) as the piston reaches the lower end of its travel it will eventually slip past and clear of the container portion 58 and into a widened space 86 so that the cuff 62 will no longer have any frictional engagement, and thus allow the piston to rotate freely with the screw member 60 without further advancing and without rubbing against the surrounding walls. In this way no damage would result if proper grease re-fill and resetting of the piston should have been neglected.

After the piston has reached its lower end of travel, if the container portion 58 is to be re-filled and the piston to be re-set to its upper end position on the screw member 60 (see Fig. 2b), the dome portion 45 may be removed, the cover 59 lifted off the container portion 58, and the screw member 60 with piston member 61 lifted out by detaching the screw member from the socket 68. The container portion 58 is then re-filled with grease, and after turning the piston member up to its initial position on the screw member, the parts are replaced, whereupon the operation can be resumed.

The jacket surrounding the bearing-block proper serves to keep surplus grease escaping from the bearing surfaces from contaminating the water in the tank. The jacket also serves to receive a quantity of oil to act as replacement fluid in the grease container portion 58. That is to say, when the piston member lowers, the void above the piston in the container portion 58 must be filled with fluid. Such fluid might be called the void fluid and can be provided by putting a quantity of oil, say one quart, into the space within the jacket. This oil would float to the top of the housing because of a quantity of water under it. Thus this oil would surround the upper part of the container portion 58 and be drawn into the container portion as the piston member lowers. Oil would enter the void by reason of the loose fit or looseness of the cover 59 upon the container portion 58.

I claim:

1. An automatic forced-feed lubricator for a rotary shaft bearing comprising a hollow base unitary with said bearing and having within its hollow transversely-extending gear-supporting means and also having feed-communicating connection with the bearing surface, a cylindrical container portion rising from said base substantially at right angles to the shaft axis to serve as a grease reservoir, a piston frictionally engaging the inner face of the container portion and movable therein for displacing grease through said base and said communicating connection, a rotatable screw member within and co-axial with said cylindrical portion and having threading engagement with said piston to impart movement thereto by rotation of the screw member, speed-reducing gearing mounted within said base which gearing comprises a gear representing the low-speed end thereof disposed underneath said supporting means and having an upwardly extending hollow hub portion rotatable although axially confined in said supporting means, a drive connection for removably holding the lower end of the screw member in said hollow hub portion, cam-like means provided upon said shaft, and motion-transmitting means effective between the high-speed end of said gearing and said cam-like means whereby each revolution of the shaft imparts a start and stop motion to said gearing and to said piston.

2. A lubricator according to claim 1, in which said drive connection comprises separable bayonet coupling means.

3. A lubricator according to claim 1, in which said gearing further comprises a secondary worm gear representing the low-speed end thereof underneath said supporting means and having an upwardly extending hub portion rotatable although axially confined in said supporting means, a secondary worm shaft rotatably mounted in said base and extending transversely and at right angles with respect to said screw member and having driving engagement with said secondary worm gear, a primary worm gear fixed on said secondary worm shaft, a primary worm shaft having driving engagement with said primary worm gear and extending above at right angles and transversely with respect to said secondary worm shaft although parallel to said rotary shaft, said primary worm shaft having a free end portion extending through and protruding outwardly from and being rotatably carried by said base and a star wheel fixed upon said protruding shaft portion and engageable by said cam-like means by imparting stepwise movements to the star wheel.

4. A lubricator adapted for delivery of lubricant to a bearing carrying a shaft comprising a hollow base having gear-supporting means, a cylindrical container portion rising from said base to serve as a grease reservoir for supplying lubricant to the bearing, a piston frictionally engaging the inner face of the container portion and movable therein for displacing grease through said base to the bearing, a rotatable screw member within and coaxial with said cylindrical portion and having threaded engagement with the piston to impart movement thereto by rotation of the screw member, speed-reducing gearing having a low speed end and a high speed end carried by said base which gearing comprises a gear representing the low-speed end thereof disposed underneath said gear-supporting means and having an upwardly extending hollow hub portion rotatable although axially confined in said gear-supporting means, a readily detachable drive connection for removably securing the lower end of the screw member in said hollow hub portion, and cam means at the high-speed end of the gearing adapted to be actuated by said shaft for intermittent actuation of the piston.

CHARLES H. SCOTT.

REFERENCES CITED

The following references are of record in the file of this patent:

UNITED STATES PATENTS

| Number | Name | Date |
|---|---|---|
| 1,148,431 | Beierly | July 27, 1915 |
| 1,170,089 | Milne | Feb. 1, 1916 |
| 1,948,747 | Dunlop | Feb. 27, 1934 |
| 2,254,670 | Turner | Sept. 2, 1941 |

FOREIGN PATENTS

| Number | Country | Date |
|---|---|---|
| 18,154 | Great Britain | 1895 |